(12) United States Patent
Gerich

(10) Patent No.: US 6,199,918 B1
(45) Date of Patent: Mar. 13, 2001

(54) PLUG-IN RAPID-ACTION COUPLING DEVICE

(76) Inventor: Adam Gerich, Grünewaldstrasse 6, D-74405 Gaildorf (DE)

( * ) Notice: Subject to any disclaimer, the term of this patent is extended or adjusted under 35 U.S.C. 154(b) by 0 days.

(21) Appl. No.: 09/176,507

(22) Filed: Oct. 21, 1998

(51) Int. Cl.$^7$ .................................................. F16L 37/098
(52) U.S. Cl. ........................ 285/308; 285/319; 285/903; 285/921
(58) Field of Search ................................... 285/319, 903, 285/921, 308

(56) References Cited

U.S. PATENT DOCUMENTS

| 3,825,288 | * | 7/1974 | Maroschak | 285/903 |
| 3,897,090 | * | 7/1975 | Maroschak | 285/903 |
| 4,220,361 | * | 9/1980 | Brandenberg | 285/921 |
| 5,096,235 | * | 3/1992 | Oetiker | 285/921 |
| 5,560,163 | * | 10/1996 | Carlton | 285/903 |

FOREIGN PATENT DOCUMENTS 94 00 905 U   5/1994   (DE) ................ F16L/33/32

* cited by examiner

Primary Examiner—Dave W. Arola
(74) Attorney, Agent, or Firm—Darby & Darby

(57) ABSTRACT

The invention relates to a plug-in rapid-action coupling device (10) for corrugated tubes (12) which have recesses (22) provided at unit spacings on the outer circumference, having a coupling body (14) with an opening (16) which passes through symmetrically and has an axis (20), having a plug-in region (18), within which the corrugated tube (12) can be arranged, and having at least one elastically deformable latching unit (30) which is provided, in the plug-in region (18), on the wall of the coupling body (14), which is arranged so as to be inclined in the direction toward the axis (20), and which, in the plugged-in state of the corrugated tube (12), latches into a recess (22) which is provided correspondingly on the corrugated tube (12), with the result that the corrugated tube (12) is secured against being drawn out, and said plug-in rapid-action coupling device (10) is distinguished in that, in the plug-in region (18), at least two slits (36), which are spaced apart essentially parallel to one another, are provided in the wall of the coupling body (14), the latching unit (30) is arranged between the slits (36) it being the case that the latching unit has a first spring element (38.1), integrally formed on the wall, and a second spring element (38.2) in each case, and the first and second spring elements (38.1, 38.2), are coupled to one another via a hinge (40) which runs essentially transversely with respect to the axis (20).

10 Claims, 2 Drawing Sheets

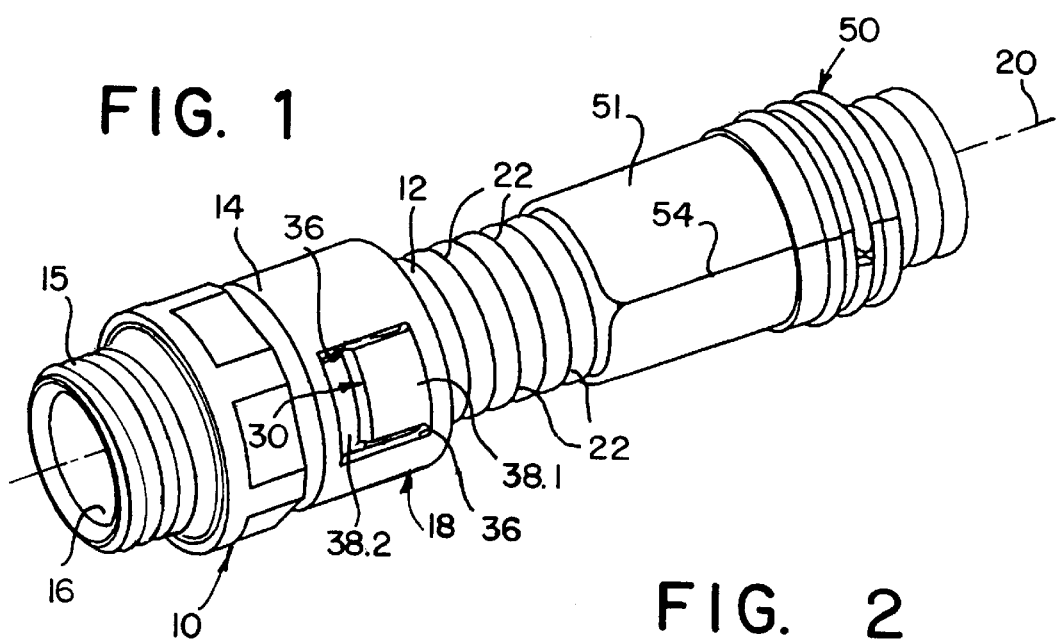
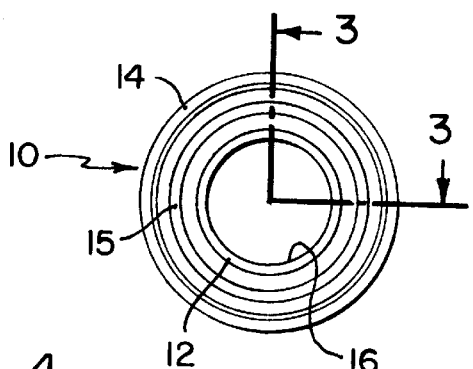
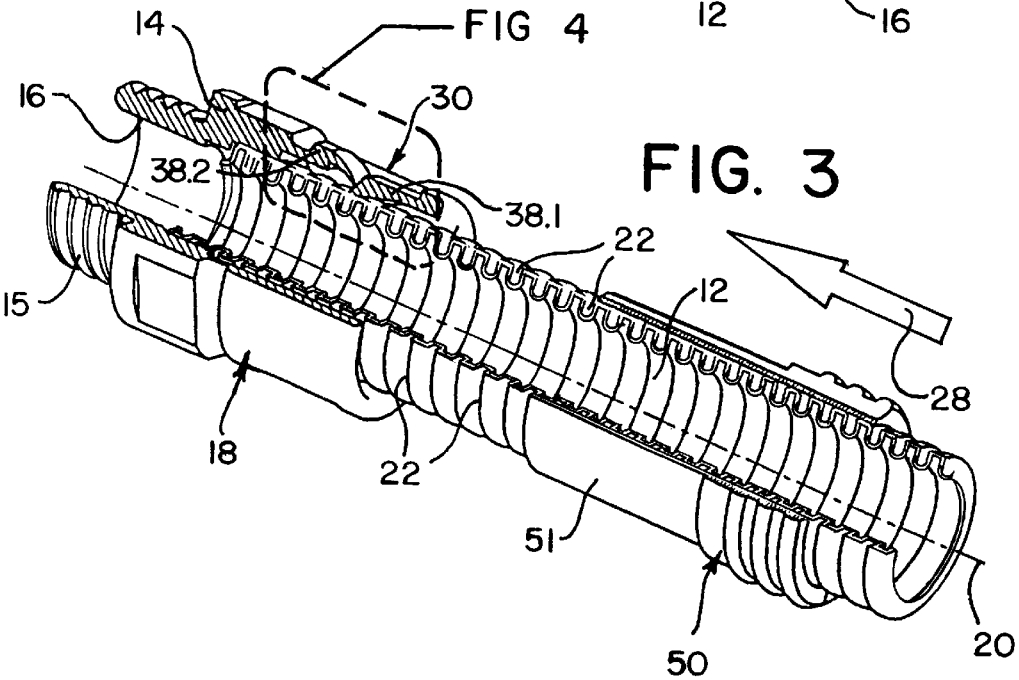

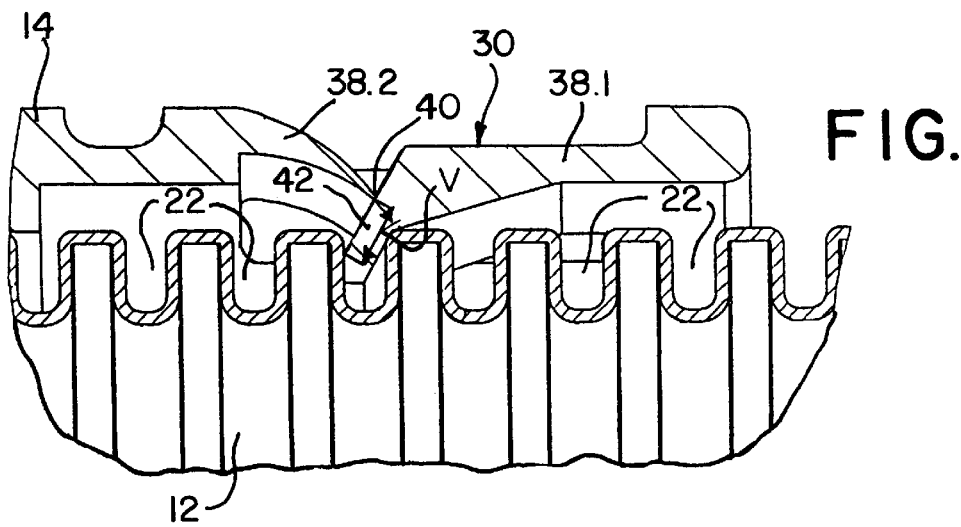
FIG. 4
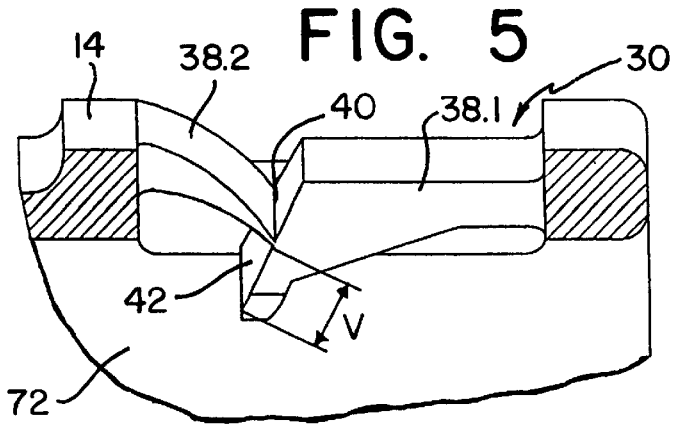
FIG. 5
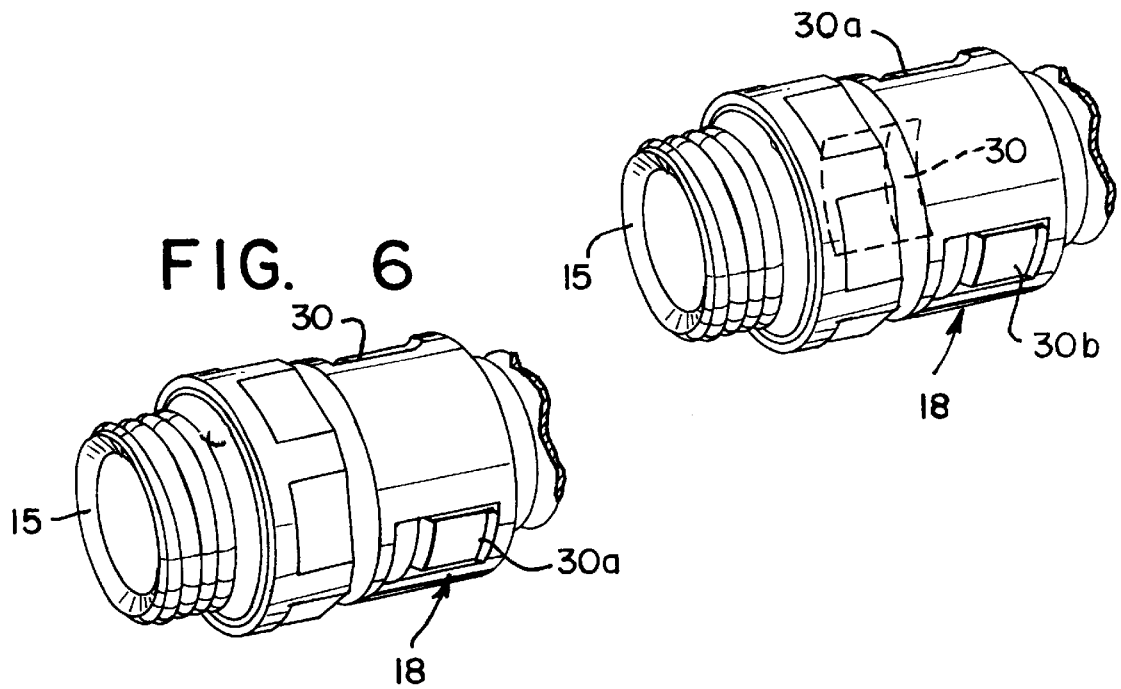
FIG. 6
FIG. 7

PLUG-IN RAPID-ACTION COUPLING DEVICE

TECHNICAL FIELD

The present invention relates to a plug-in rapid-action coupling device for corrugated tubes which have recesses provided at unit spacings on the outer circumference, having a coupling body with an opening which passes through symmetrically and has an axis, having a plug-in region, within which the corrugated tube can be arranged, and having at least one elastically deformable latching unit which is provided, in the plug-in region, on the wall of the coupling body, which is arranged so as to be inclined in the direction toward the axis, and which, in the plugged-in state of the corrugated tube, latches into a recess which is provided correspondingly on the corrugated tube, with the result that the corrugated tube is secured against being drawn out.

Such devices are used in equipment where a multiplicity of electric lines are to be routed from a starting position to an end position. The electric lines are combined into a strand, which is routed within a corrugated tube in order to protect it against external influences. The plug-in rapid-action coupling devices are intended to permit a straightforward plugging-in and releasing operation of the corrugated tube and to ensure permanently reliable functioning.

PRIOR ART

In the case of conventional plug-in rapid-action coupling devices of the type mentioned in the introduction, which normally consist of plastic, the coupling body is at least partially frustoconical, is provided with at least one slit and with an external thread, which bears an actuating element (threaded screw) with internal thread. If, then, the actuating element is screwed to the coupling body, the internal diameter of the coupling body is then reduced, this resulting in the tube being subjected to the action of force which ensures that the tube is operatively connected to the rapid-action coupling. In order to produce an appropriate connection, the actuating element has to be tightened firmly, as a result of which the tube may be damaged, at least in the long term, to be precise in particular when the tubes in question have a rough surface.

The applicant has developed a plug-in rapid-action coupling device with an actuating element which has at least one blocking body and can be adjusted between an active operating position, in which the blocking body can be operatively connected to the tube, and an operating position in which the tube is released, it being the case that there is formed in the coupling body at least one recess which is coordinated with the blocking body and which has the blocking body passing through it in the active operating position of the actuating element, and it being the case that the actuating element can be rotated about the axis of the tube between its two operating positions, is slit axially and is elastically deformable. In order to produce an operationally reliable connection of the corrugated tube to the rapid-action coupling device, such a device requires an additional actuating element, which also has to be actuated in the event of the tube being released. The provision of an additional actuating element requires increased installation outlay and is thus regarded in many cases as being disadvantageous.

German Utility Model G 94 00 905.8 discloses a plug-in rapid-action coupling device of the generic type. In this case, the latching unit is designed as a tongue unit.

DESCRIPTION OF THE INVENTION

Taking the abovementioned prior art as the departure point, the object, or the technical problem, on which the invention is based is to develop the plug-in rapid-action coupling device of the generic type such that it can be handled extremely easily, has a small number of structural units, thus ensures cost-effective installation and, furthermore, ensures a reliable coupling and uncoupling operation. It is also intended to counteract the penetration of dirt in the plug-in region.

The invention is given by the features of independent claim 1. Advantageous configurations and developments are given by the features of the dependent claims.

Accordingly, the inventive plug-in rapid-action coupling device of the type mentioned in the introduction is distinguished in that, in the plug-in region, at least two slits, which are spaced apart essentially parallel to one another, are provided in the wall of the coupling body, the latching unit is arranged between the slits, it being the case that the latching unit has a first spring element, integrally formed on the wall, and a second spring element in each case, and the first and second spring elements are coupled to one another via a hinge which runs essentially transversely with respect to the axis. According to a particularly preferred configuration of the plug-in rapid-action coupling device according to the invention, the hinge is designed as a film hinge.

The slits may be arranged preferably parallel, or essentially transversely with respect to the direction of the axis of the device.

Since just two slits are provided per latching unit, it being possible for the width of said slits to be kept very small, this counteracts the penetration of dirt in the plug-in region, which means a considerable improvement in relation to the known tongue units, which are cut out on three sides and have relatively wide slits.

A particularly preferred configuration of the device according to the invention is distinguished in that the first spring element has a protrusion unit which is oriented inward, i.e. in the direction of the axis, and to which the second spring element is connected via the hinge with an offset in the outward direction, as seen from the inner border of the protrusion unit, which results in particularly reliable latching.

As regards an auxiliary spring action, it has proven favorable to provide the second spring element with an inwardly curved cross-sectional progression, the second spring element preferably having a cross-sectional thickness which decreases toward the hinge.

The second spring element preferably has a radius of curvature in the region of from 3 to 4 cm.

The provision of a latching unit which is mounted in an elastically resilient manner in the inward direction and comprises two coupled spring elements means that, when the corrugated tube is in the plugged-in state, said latching unit reliably latches into the corresponding recess of the corrugated tube and ensures that the corrugated tube is arrested securely. In contrast to known devices, the latching units are drawn inward, that is to say in the direction of the tube, when the tube is subjected to tensile stressing. This achieves a considerably higher retaining force for the tube in the coupling body. Since the latching unit is integrally formed on the coupling body, this means that there is just one component into which the corrugated tube has to be plugged. The actuating element known in the prior art is dispensed with completely. This results in advantages as regards the production of the plug-in rapid-action coupling device since there is no need for a plurality of parts to be installed. In terms of handling as well, there are advantages over the prior art since actuation of a further part, namely the fastening element, is not necessary for the purpose of connecting the corrugated tube.

In a preferred configuration of the plug-in rapid-action coupling device according to the invention, the latching unit is connected integrally to the wall of the coupling body, which is advantageous, in particular, as regards the production of the device from plastic.

As regards the plugged-in corrugated tube being secured in a stable position, it has proven favorable for the latching means to be formed with at least two/three units which are respectively offset from one another by 180 degrees or 120 degrees.

A particularly preferred configuration of the plug-in rapid-action coupling device according to the invention is distinguished in that the latching unit is inclined in the inward direction, i.e. toward the axis, as seen in the plug-in direction of the corrugated tube, as a result of which, on the one hand, straightforward introduction of the corrugated tube is ensured and, on the other hand, the opening unit can easily be introduced for the purpose of releasing the tube.

According to a preferred configuration, the latching means can be deformed elastically outward, i.e. away from the axis, by a flat opening unit, which can be introduced between the inner wall of the coupling body and the outer wall of the corrugated tube, with the result that said latching means releases the recess and the corrugated tube can be drawn out.

An advantageous design according to the invention of a plug-in rapid-action coupling device is distinguished in that the opening unit has a cross-sectional contour which is adapted, at least in certain areas, to the external diameter of the corrugated tube, and the wall thickness of the opening unit is such that the opening unit can be introduced between the inner wall of the coupling body, in the plug-in region, and the external-diameter contour of the corrugated tube. For opening purposes, the opening unit is first of all positioned on the outer contour of the tube and then introduced into the interspace.

The opening unit preferably has an axial slit and is designed as a cylindrical component. The opening unit preferably has an axially arranged film hinge, the opening unit consisting of plastic, in particular polyamide or polystyrene. The film hinge allows the opening unit to swing open, with the result that first of all it can be positioned around the tube and then it can be introduced into the interspace between the coupling body and tube.

The plug-in rapid-action coupling device according to the invention also consists preferably of plastic, in particular polyamide or other plastics.

The provision of an opening unit means that the plug-in rapid-action coupling device according to the invention can easily be released from a plugged-in corrugated tube. The installer in each case is provided with just one opening unit, i.e. the opening unit functions as a key for releasing the corrugated tube from the plug-in rapid-action coupling device according to the invention. As a result, the installer requires just one such component, i.e. the opening unit, in order to carry out any releasing operation which may be necessary. It may be regarded as advantageous in comparison with known rapid-action coupling devices since, rather than each rapid-action coupling as such requiring an additional actuating element for releasing purposes, one component can be used, if required, for all the rapid-action coupling devices, in order to initiate the releasing operation.

The opening unit ensures, in particular, that the plug-in rapid-action coupling can be separated from the tube only with the aid of the opening unit (key) and thus only by an authorized individual.

Further embodiments and advantages of the invention can be gathered from the other features given in the claims and from the exemplary embodiments specified hereinbelow. The features of the claims may be combined with one another as desired, as long as they are not obviously mutually exclusive.

BRIEF DESCRIPTION OF THE DRAWING

The invention and advantageous embodiments and developments of the same are explained and described in more detail hereinbelow with reference to the examples illustrated in the drawing. The features which can be gathered from the description and drawing can be used according to the invention on their own or together in any desired combination. In the drawing:

FIG. 1 shows a schematic perspective illustration of an inventive plug-in rapid-action coupling device with latching units with in each case two connected spring elements, FIG. 2 shows a schematic end view of the device according to FIG. 1, FIG. 3 shows a schematic sectional illustration in perspective of a detail of the device according to FIG. 1 along section line 3—3 according to FIG. 2, FIG. 4 shows a schematic sectional illustration of the detail shown in the dashed lines according to FIG. 3, FIG. 5 shows a schematic sectional illustration, partially in perspective, of the detail A according to FIG. 3, FIG. 6 is a partial schematic perspective view of the plug-in rapid-action coupling device with two latching units offset by approximately 180 degrees; and FIG. 7 is a partial schematic perspective view of the plug-in rapid-action coupling device with three latching units offset by approxiamately 120 degrees.

METHODS OF IMPLEMENTING THE INVENTION

A plug-in rapid-action coupling device 10 has a coupling body 14 with an opening 16 passing through it, said opening being provided in a rotationally symmetrical manner about an axis 20. In its front region, the coupling body 14 has an external thread 15 which serves for connection to equipment (not illustrated in the figures). In the region which is on the right in FIG. 1, and is referred to as plug-in region 18 hereinbelow, a corrugated tube 12 can be plugged in within the plug-in region 18 and is secured in its plugged-in position by a latching unit 30 integrally formed on the wall of the coupling body 14, in the plug-in region 18. The corrugated tube 12 has recesses (troughs) 22 which are provided at predetermined unit spacings on the circumference, it being the case that, when the corrugated tube 12 is in the plugged-in state, the latching unit 30 latches into a correspondingly provided recess 22 of the corrugated tube 12. The latching unit 30 is arranged between two thin slits 36 which run parallel to the axis 20.

As is illustrated in detail in FIGS. 4 and 5, the latching unit has a first spring element 38.1 and a second spring element 38.2, each of these being integrally formed directly on the wall of the plug-in region 18 of the coupling body 14. The two spring elements 38.1, 38.2 are connected to one another via a film hinge 40. The first spring element 38.1 has a protrusion unit 42 which is oriented inward, i.e. in the direction of the axis 20. When the corrugated tube 12 is in the plugged-in state, said protrusion unit 42 latches into a corresponding recess 22 in a certain area of the corrugated tube 12.

The second spring element 38.2, which is coupled to the first spring element 38.1 via the film hinge 40, has an inwardly curved cross-sectional contour, the cross-sectional thickness decreasing toward the film hinge 40. At the same time, the second spring element 38.2 is coupled, via the film hinge 40, to the first spring element 38.1 with an offset V in the outward direction, as seen from the inner side, on the end side of the protrusion unit 42. Such a design of the spring elements 38.1, 38.2 provides a sufficiently elastic latching unit which, on the one hand, permits straightforward introduction of the corrugated tube and, on the other hand, ensures reliable latching. The reliable latching is enhanced, in particular, by the geometrical design of the spring element 38.2 in the form of a "curved leaf spring", this effecting increased force action in the direction of the axis 20 of the corrugated tube 12. In addition, the plug-in region 18 is provided just with slits 36 for small cross-sectional dimensions, this counteracting the risk of contamination.

The inward inclination of the protrusion unit 42 of the latching unit 30 means that, if an attempt is made to draw out the corrugated tube 12, the latter is moved or forced further in the inward direction, i.e. in the direction of the axis 20, this securing the corrugated tube even more.

The inner-wall diameter of the coupling body 14 in the plug-in region 18 is somewhat larger than the outer-contour diameter of the corrugated tube 12. This means that an opening unit 50 according to FIG. 1 can be pushed in between the outer contour of the corrugated tube 12 and the inner contour of the coupling body 14 in the plug-in region 18, said opening unit acting on the latching unit 30 to the effect that the latter deforms elastically outward and thus releases the corrugated tube 12. Introduction of the opening unit 50 thus enables the corrugated tube 12 to be easily released from the plug-in rapid-action coupling device 10.

The opening unit 50 is an essentially cylindrical component, of which the wall thickness is sufficiently thin, at least in the front end region 51, to permit introduction between the outer contour of the corrugated tube 12 and the inner wall of the coupling body 14 in the plug-in region 18.

In order that the opening unit 50 can easily be positioned around the plugged-in corrugated tube 12, said unit has an axial slit (not illustrated in the figures), and there is also provided, opposite the slit, a film hinge 54, which permits straightforward shell-like opening of the opening unit 50 for positioning of the latter around the corrugated tube 12 prior to the actual releasing operation.

In order to ensure a certain stability of the opening unit 50 as such, the axial progression of the slit is selected such that a protrusion 56 or set-back section is formed essentially in the central region of the opening unit, as a result of which mutual displacement of the slit ends in the axial direction is prevented to the greatest possible extent.

The latching units 30 are each offset on the wall of the coupling body 14, in the plug-in region 18, by 120 degrees with respect to one another, to be precise as seen in the circumferential direction of the opening 16. This ensures that the plugged-in corrugated tube 12 is reliably latched in and secured in position.

When the corrugated tube is subjected to tensile stressing counter to arrow direction 28, the geometrical design of the latching unit 30 with its two spring elements 38.1, 38.2 and the protrusion unit 42 with inclination toward the axis 20 mean that said unit is forced further inward in the direction of the axis 20, as a result of which the latched-in position is additionally secured. The latching unit 30 is displaced inward up to a stop which is formed by the outer contour of the corrugated tube 12. This prevents the tube 12 from being damaged in the recess region. An increase in the tensile stressing thus results in the corrugated tube 12 being retained more securely in its latched-in position by the latching unit 30. At the same time, easy release of the corrugated tube 12 is possible, if necessary. Since the end region 51 of the opening unit 50 is pushed between the outer wall of the corrugated tube 12 and the latching unit 30 during the releasing operation, said latching unit is deformed elastically outward and releases its latched-in position. In this state, the corrugated tube 12 can easily be drawn out.

What is claimed is:

1. A plug-in rapid-action coupling device (10) for corrugated tubes (12) having recesses (22) provided at predetermined spacings on the outer circumference, said device comprising:

a coupling body (14) having an opening (16), the opening extending through the coupling body symmetrically about an axis (20), the coupling body having a plug-in region (18) with the corrugated tube (12) being insertable therein, the plug-in region (18) having at least two slits (36) spaced substantially parallel to one another defined in a wall of the coupling body (14);

at least one elastically deformable latching unit (3) disposed in the plug-in region (18) of the wall of the coupling body (14) between the slits (36) and inclined in a direction towards the axis (20), in the plugged-in state when the corrugated tube (12) is inserted into the coupling body the latching unit (3) latches into a recess (22) on the corrugated tube (12) so as to prevent the corrugated tube (12) from being drawn out, each latching unit comprising:

a first spring element integrally formed on the wall of the coupling body (14);

a second spring element integrally formed on the wall of the coupling body;

a hinge (40) coupling the first and second spring elements, the hinge being arranged substantially transverse to the axis (20).

2. The device as claimed in claim 1, wherein the hinge (40) is a film.

3. The device as claimed in claim 1, wherein the slits (36) are arranged substantially parallel to the axis (20).

4. The device as claimed in claim 3, wherein the device has at least two latching units (30) respectively offset by approximately 180 degrees in a circumferential direction.

5. The device as claimed in claim 3, wherein the device has at least three latching units (30) respectively offset by approximately 120 degrees in a circumferential direction.

6. The device as claimed in claim 1, wherein the slits (36) are arranged substantially transverse to the axis (20).

7. The device as claimed in claim 1, wherein the first spring element (38.1) includes a protrusion unit (42) oriented inward towards the axis (20), and the second spring element (38.2) is connected via the hinge (40) with an offset (V) in an outward direction, as seen from the inner border of the protrusion unit (42).

8. The device as claimed in claim 1, wherein the second spring element (38.2) has an inwardly curved cross-sectional progression.

9. The device as claimed in claim 1, wherein the second spring element (38.2) has a cross-sectional thickness that decreases toward the hinge (40).

10. The device as claimed in claim 1, further comprising an opening unit (50), the latching unit (30) being deformable elastically outward away from the axis (20) by the opening unit (50).

* * * * *